United States Patent
Shin

(10) Patent No.: US 10,403,055 B2
(45) Date of Patent: Sep. 3, 2019

(54) INCOMING AND OUTGOING VEHICLE MANAGEMENT METHOD AND INCOMING AND OUTGOING VEHICLE MANAGEMENT SYSTEM BASED ON VEHICLE NUMBER AND VEHICLE TYPE IDENTIFIED THEREFROM

(71) Applicant: PARKINGCLOUD CO., LTD., Seoul (KR)

(72) Inventor: Sang-Yong Shin, Seoul (KR)

(73) Assignee: PARKINGCLOUD CO., LTD., Seoul (KR)

( * ) Notice: Subject to any disclaimer, the term of this patent is extended or adjusted under 35 U.S.C. 154(b) by 238 days.

(21) Appl. No.: 15/584,843

(22) Filed: May 2, 2017

(65) Prior Publication Data

US 2017/0330389 A1   Nov. 16, 2017

(30) Foreign Application Priority Data

May 10, 2016   (KR) .......................... 10-2016-0056789

(51) Int. Cl.
*G07B 15/06*   (2011.01)
*G07B 13/04*   (2006.01)
(Continued)

(52) U.S. Cl.
CPC ......... *G07B 15/063* (2013.01); *G07B 13/045* (2013.01); *G07B 15/00* (2013.01);
(Continued)

(58) Field of Classification Search
CPC ...... G07B 15/063; G07B 15/00; G07B 15/04; G07B 13/045; G04C 5/0808; G07C 5/008;
(Continued)

(56) References Cited

U.S. PATENT DOCUMENTS 6,084,532 A * 7/2000 Prieto .................... G07B 15/04
235/384
8,988,188 B2 * 3/2015 Chang ................ G07C 9/00563
340/5.53

(Continued)

FOREIGN PATENT DOCUMENTS

KR   1020010035919   5/2001
KR   1020090069943   7/2009

*Primary Examiner* — Mary Cheung
(74) *Attorney, Agent, or Firm* — IPLA P.A.; James E. Bame

(57) ABSTRACT

Provided is an incoming and outgoing vehicle management method and an incoming and outgoing vehicle management system that are based on a vehicle number and a vehicle type identified therefrom, the method and system including: receiving incoming vehicle information including a vehicle number recognized from a vehicle image, and incoming time or an incoming gate identifier; determining a vehicle type by using the vehicle number of the incoming vehicle information; and generating an incoming vehicle message for directing the incoming vehicle to an incoming gate and transmitting the generated incoming vehicle message to a portable terminal designated to a user of the vehicle, wherein the incoming vehicle message includes incoming identification information that indicates the recognized vehicle number, and the incoming time or the incoming gate identifier.

8 Claims, 3 Drawing Sheets

(51) Int. Cl.
*G07C 5/00* (2006.01)
*G07C 5/08* (2006.01)
*G07B 15/00* (2011.01)
*G07B 15/04* (2006.01)
*G06Q 30/06* (2012.01)
*G06Q 50/30* (2012.01)
*H04W 24/04* (2009.01)
*H04W 24/08* (2009.01)

(52) U.S. Cl.
CPC .............. *G07B 15/04* (2013.01); *G07C 5/008* (2013.01); *G07C 5/0808* (2013.01); *G06Q 30/0645* (2013.01); *G06Q 50/30* (2013.01); *H04W 24/04* (2013.01); *H04W 24/08* (2013.01)

(58) Field of Classification Search
CPC ...... H04W 24/08; H04W 24/04; G06Q 50/30; G06Q 30/0645
See application file for complete search history.

(56) References Cited

U.S. PATENT DOCUMENTS

| | | | | |
|---|---|---|---|---|
| 2004/0068433 A1* | 4/2004 | Chatterjee | ............ | G06Q 20/127 705/13 |
| 2004/0230480 A1* | 11/2004 | Kanayama | ............. | G06Q 20/14 705/13 |
| 2013/0339024 A1* | 12/2013 | Kojima | ................. | G08G 1/123 704/270.1 |
| 2015/0088738 A1* | 3/2015 | Cateland | .............. | G06Q 20/227 705/41 |
| 2017/0046672 A1* | 2/2017 | Cha | ....................... | G06Q 20/102 |
| 2017/0109942 A1* | 4/2017 | Zivkovic | ................ | G06Q 10/02 |

* cited by examiner

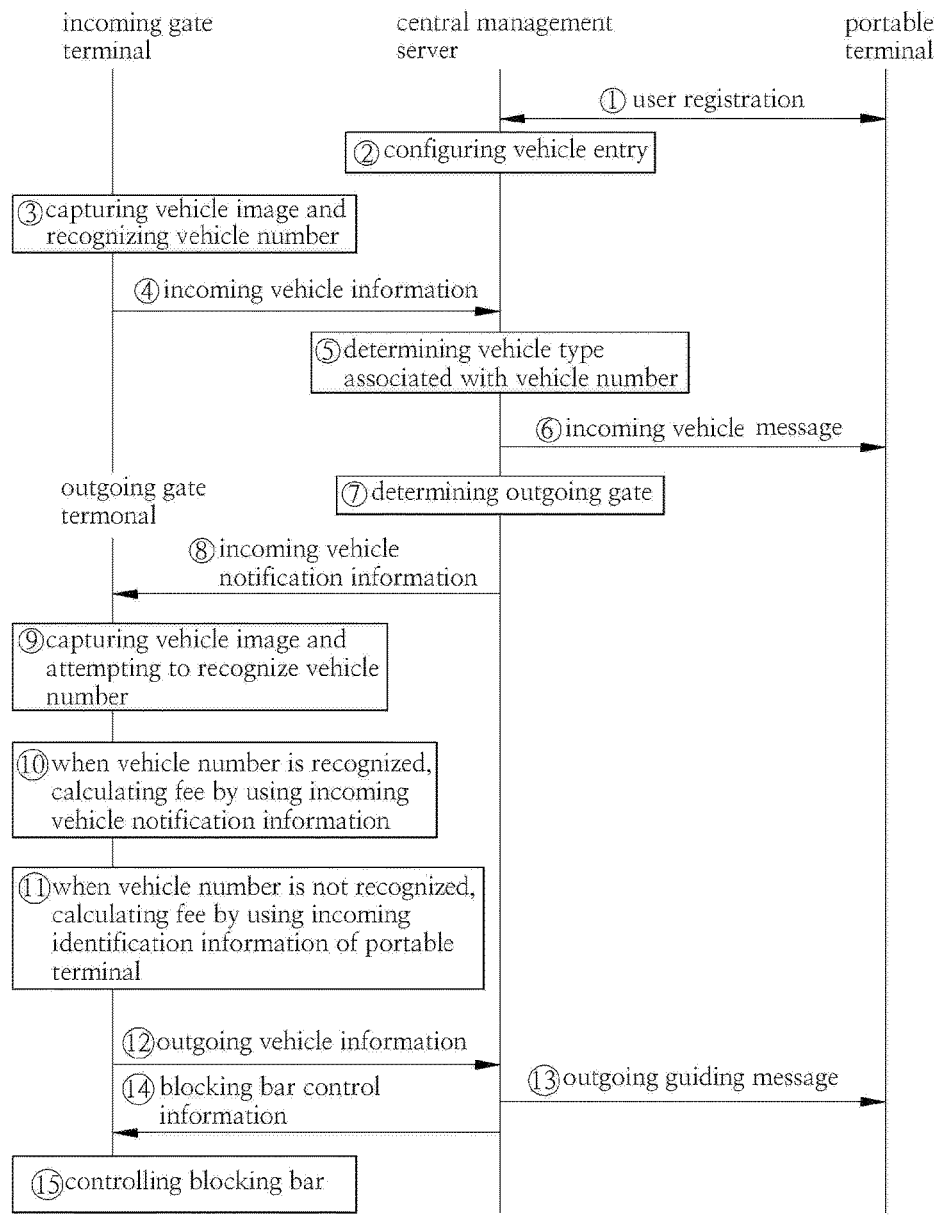

INCOMING AND OUTGOING VEHICLE MANAGEMENT METHOD AND INCOMING AND OUTGOING VEHICLE MANAGEMENT SYSTEM BASED ON VEHICLE NUMBER AND VEHICLE TYPE IDENTIFIED THEREFROM

CROSS REFERENCE

The present application claims priority to Korean Patent Application No. 10-2016-0056789, filed May 10, 2016, the entire contents of which is incorporated herein for all purposes by this reference.

BACKGROUND

The present invention generally relates to an incoming and outgoing vehicle management method and an incoming and outgoing vehicle management system that are based on a vehicle number and a vehicle type identified therefrom. More particularly, the present invention relates to an incoming and outgoing vehicle management method and an incoming and outgoing vehicle management system that are based on a vehicle number and a vehicle type identified therefrom, the method and system being capable of recognizing a vehicle number by using a camera, automatically determining a vehicle type associated with the recognized vehicle number, managing incoming and outgoing of a vehicle, and automatically calculating a fee according to incoming and outgoing of the vehicle.

The use and management of vehicles, incurs various fees. For example, vehicle users pay for parking spaces at the time of parking, expressway tolls when using highways, and gasoline at gas stations. In addition, vehicle users pay for maintenance costs that are necessary for maintenance of the vehicle.

The various fees vary according to vehicle types. For example, a fee for a parking space may differ depending on whether the vehicle type is a subcompact car, a compact car, or a full size car, etc.

General known methods of recognizing a vehicle type includes a method in which a vehicle user describes his or her vehicle type, and a method of automatically recognizing vehicle types. The method of automatically recognizing the vehicle type may automatically recognize a vehicle type by using a hardware height limit recognizer, a length measuring instrument, a weight measuring instrument, a camera recognition device, etc. (Refer to Patent Document 1).

However, conventionally used methods of recognizing vehicle types require time since the methods depends on verbal information of a vehicle user or depend on hardware modules, and there is a limit in accurately recognizing a vehicle type due to physical recognition limitations of the hardware.

Furthermore, disputes may arise between the vehicle user and a service provider, a recognition error due to the hardware may occur, and there is a significant cost burden to satisfy requirements of such hardware.

Thus, there is a need for an incoming and outgoing vehicle management method and an incoming and outgoing vehicle management system that are based on a vehicle number and a vehicle type identified therefrom whereby problems and limitations of conventional vehicle type recognition methods are overcome, vehicle types of vehicles are efficiently recognized at low cost, and various vehicle related services that are provided according to a vehicle type may be effectively provided.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent Application Publication No. 10-2009-0069943 (Highway toll collection system using vehicle-number and vehicle type recognition, Jul. 1, 2009); and (Patent Document 2) Korean Patent Application Publication No. 10-2001-0035919 (Toll collection system, May 7, 2001)

SUMMARY OF THE INVENTION

Accordingly, the present invention has been made keeping in mind the above problems occurring in the related art, and the present invention is intended to provide an incoming and outgoing vehicle management method and an incoming and outgoing vehicle management system that are based on a vehicle number and a vehicle type identified therefrom and are capable of automatically determining vehicle type information associated with the recognized vehicle number in association with recognition of a license plate.

In addition, another object of the present invention is to provide an incoming and outgoing vehicle management method and an incoming and outgoing vehicle management system that are based on a vehicle number and a vehicle type identified therefrom whereby vehicle type information may be quickly obtained at low cost, and a service among various vehicle related services may be provided by using the obtained vehicle type information.

In addition, still another object of the present invention is to provide an incoming and outgoing vehicle management method and an incoming and outgoing vehicle management system that are based on a vehicle number and a vehicle type identified therefrom whereby an automated navigation and service may be provided to a user of a vehicle at low cost by providing vehicle related services and enabling payments to be made using a portable terminal.

Technical objects to be achieved by the present invention are not limited to the above-described objects and other technical objects that have not been described will be evidently understood by those skilled in the art from the following description In order to achieve the above object, according to one aspect of the present invention, there is provided an incoming and outgoing vehicle management method based on a vehicle number and a vehicle type identified therefrom including: receiving, by a central management server, incoming vehicle information including a vehicle number recognized from a vehicle image, and incoming time or an incoming gate identifier; determining, by the central management server, a vehicle type by using the vehicle number included in the incoming vehicle information; and generating an incoming vehicle message for directing the incoming vehicle to an incoming gate and transmitting, by the central management server, the generated incoming vehicle message to a portable terminal designated to a user of the vehicle, wherein the incoming vehicle message includes incoming identification information that indicates the recognized vehicle number, and the incoming time or the incoming gate identifier.

In addition, in order to achieve the above object, according to another aspect of the present invention, there is provided an incoming and outgoing vehicle management system based on a vehicle number and a vehicle type identified therefrom including: a central management server identifying a vehicle type based on a vehicle number, and managing incoming and outgoing of a vehicle, the central management server including: a communication unit receiving/transmitting data from/to an incoming gate terminal and an outgoing gate terminal, and receiving incoming vehicle information including a vehicle number recognized from a vehicle image, and incoming time or an incoming gate identifier from the incoming gate terminal; and a control unit determining the vehicle type of the vehicle by using the vehicle number of the incoming vehicle information, generating an incoming vehicle message for directing an incoming vehicle to an incoming gate, and transmitting the generated incoming vehicle message to a portable terminal designated to a user of the vehicle, wherein the incoming vehicle message includes incoming identification information that indicates the recognized vehicle number, and the incoming time or the incoming gate identifier.

There is an effect for an incoming and outgoing vehicle management method and an incoming and outgoing management vehicle system that are based on a vehicle number and a vehicle type identified therefrom according to the present invention described above to automatically determine vehicle type information associated with the recognized vehicle number in association with recognition of a license plate.

In addition, there is an effect for an incoming and outgoing vehicle management method and an incoming and outgoing management vehicle system that are based on a vehicle number and a vehicle type identified therefrom according to the present invention described above to quickly obtain vehicle type information at low cost and to provide a service among various vehicle related services by using the obtained vehicle type information.

In addition, there is an effect an incoming and outgoing vehicle management method and an incoming and outgoing management vehicle system that are based on a vehicle number and a vehicle type identified therefrom according to the present invention described above to provide vehicle related services and enable payments to be made using a portable terminal, thus to provide an automated navigation and service.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The above and other objects, features and other advantages of the present invention will be more clearly understood from the following detailed description when taken in conjunction with the accompanying drawings, in which:

FIG. 4 is a view showing an exemplary flow of an incoming and outgoing vehicle management method based on a vehicle type identified from a vehicle number.

DETAILED DESCRIPTION OF THE INVENTION

The objects, features and advantages of the invention will appear more fully upon consideration of the illustrative embodiments now to be described in detail with the accompanying drawings. Accordingly, the technological concepts of the present invention can be easily understood by one skilled in the art. In addition, the detailed description of know techniques relating to the present invention will be omitted so as not to obscure the gist of the invention. Hereinbelow, exemplary embodiments of the present invention will be described in detail with reference to the accompanying drawings FIG. 1 is a view showing an exemplary system block diagram of an incoming and outgoing vehicle management system.

Figure 1:
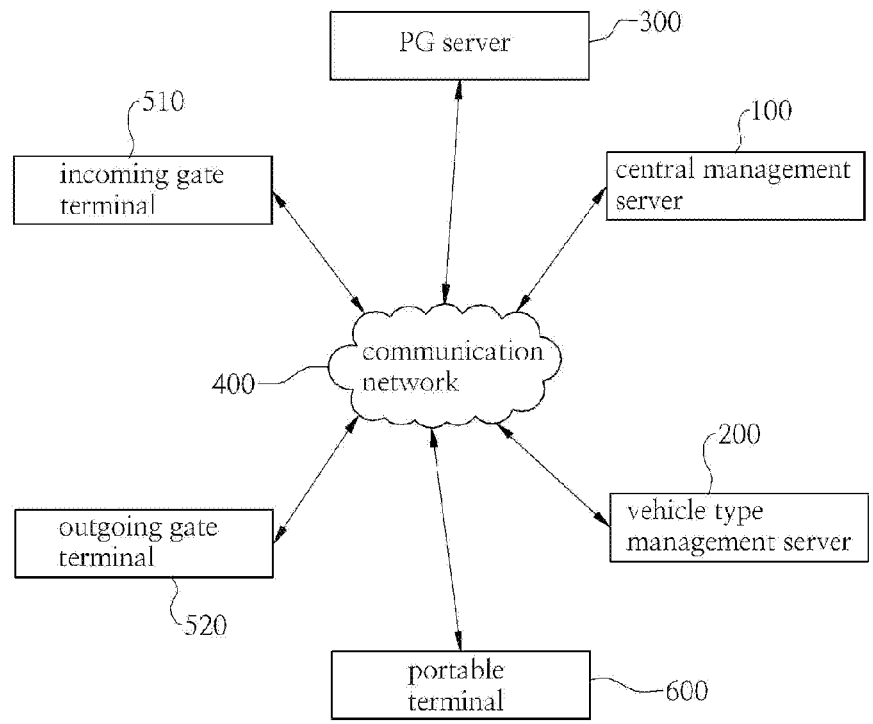
FIG. 1 is a view showing an exemplary system block diagram of an incoming and outgoing vehicle management system.

According to FIG. 1, the incoming and outgoing vehicle management system of the present invention includes: a central management server 100, a vehicle type management server 200, a PG server 300, a communication network 400, at least one local management system 500 (Refer to FIG. 3), and a portable terminal 600, the local management system 500 includes at least one incoming gate terminal 510 or at least one outgoing gate terminal 520 or both. The incoming and outgoing vehicle management system of the present invention may be a system for managing a parking lot, a system for managing a toll road such as express way, or a system for providing a differentiated service according to a vehicle type. The incoming and outgoing vehicle management system of the present invention may manage incoming and outgoing of a vehicle based on a vehicle number and a vehicle type identified therefrom.

Referring to FIG. 1, blocks of the incoming and outgoing vehicle management system of the present invention will be described, the central management server 100 is a server used for remotely managing incoming and outgoing of vehicles that occur in each local management system 500. The central management server 100 is configured to manage users that use the incoming and outgoing vehicle management system of the present invention and manage vehicles of the respective users.

The central management server 100 manages incoming and outgoing of a vehicle by identifying a vehicle type based on a vehicle number. The central management server 100 is configured to identify a vehicle type associated with a vehicle number recognized by a number of local management systems 500, and to transmit identified vehicle type information to the local management system 500 or to calculate various fees by using the identified vehicle type information.

When the incoming and outgoing vehicle management system is used for managing incoming and outgoing of vehicles in a toll road, the central management server 100 may calculate a toll fee according an identified vehicle type. When the incoming and outgoing vehicle management system is used for managing incoming and outgoing of vehicles in a parking lot, the central management server 100 may calculate a parking fee according to an identified vehicle type. According to other purposes of the incoming and outgoing vehicle management system, the central management server 100 may calculate or derive a calculation of various fees according to an identified vehicle type.

The central management server 100 will be described in detail with reference to FIG. 2.

The vehicle type management server 200 is a server used for managing vehicle types (information) of arbitrary vehicles. For example, the vehicle type management server 200 may be a server used in a vehicle registration office or in a vehicle inspection center or both. The vehicle type management server 200 may receive vehicle type information requesting message (data) including a vehicle number from the central management server 100 by being connected to the central management server 100 through the communication network 400. The vehicle type management server 200 may retrieve a vehicle type associated with the vehicle number of the received vehicle type information requesting message, and transmit to the central management server 100 by generating a response message (data) that indicates the retrieved vehicle type through the communication network 400.

The PG server 300 is a server that is managed by a payment gateway. The PG server 300 provides various functions that are related to credit card authorizing, approving, and payment of a credit card. Fees for the incoming and outgoing vehicle management system may be pre-purchased or processed in real time by using the PG server 300.

The communication network 400 receives and transmits data. The communication network 400 receives and transmits packets between devices and servers by being connected thereto. The communication network 400 may include a local area network (LAN) and a broadband network. The communication network 400 includes a mobile radio communication network and also includes an internet network. The mobile radio communication network may be recognized as a part of the Internet network.

The communication network 400 may include a dedicated network. For example, the communication network 400 may include a dedicated network to transceive data between the central management server 100 and at least one local management system 500.

The local management system 500 is a system for managing a business place where provides a service within a predetermined space. For example, the local management system 500 may be a system for managing a specific parking lot, a system for managing a specific tollgate of a toll road, or a system for providing a differentiated service according to a vehicle type.

The local management system 500 is configured to automatically recognize a vehicle number. It is preferable for the local management system to include a camera to recognize the vehicle number, and to identify a vehicle type associated with the recognized vehicle number.

The local management system 500 is configured to be connected to the central management server 100 through the communication network 400, identify a vehicle type associated with a recognized vehicle number through an interface with the central management server 100, and calculate a differentiated fee according thereto.

The local management system 500 is configured to include at least one incoming gate terminal 510 and at least one outgoing gate terminal 520. The incoming gate terminal 510 is configured to recognize a vehicle number of an incoming vehicle, and the outgoing gate terminal 520 is configured to recognize a vehicle number of an outgoing vehicle.

The local management system 500 will be described in detail with reference to FIG. 3.

The portable terminal 600 is a terminal that a user of a vehicle carries. The portable terminal 600 is a terminal that is connected to the communication network 400, and may be a mobile phone, a smartphone, a tablet PC, a notebook, etc. or may be a dedicated terminal that is configured according to the present invention.

Figure 2:
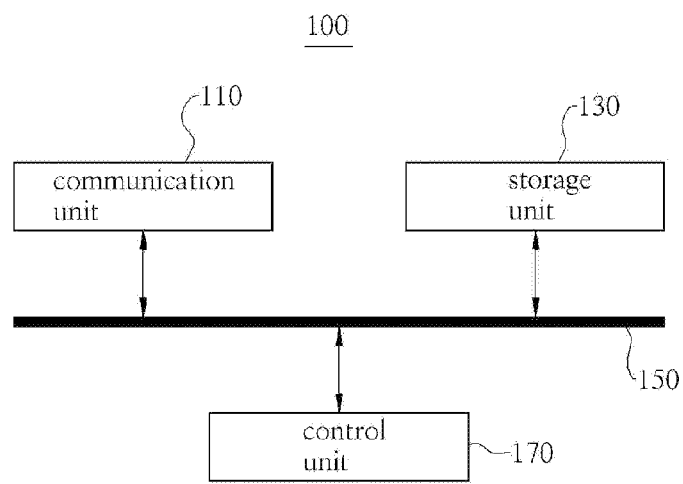
FIG. 2 is an exemplary block diagram of a central management server.

FIG. 2 is a view showing an exemplary block diagram of the central management server 100.

According to FIG. 2, the central management server 100 includes a communication unit 110, a storage unit 130, a connecting unit 150, and a control unit 170. Preferably, the block diagram of FIG. 2 shows a functional block diagram, and the central management server 100 includes hardware that implements the above functional block diagram.

For example, the central management server 100 includes a LAN card and a LAN chipset that are connected to a wired or a wireless LAN, at least one hard disk storing programs and various data, at least one processor executing a program, a parallel/serial bus that transceiver various digital data between a hard disk, a processor, and a LAN card.

In addition, the central management server 100 is configured as a combination of at least one computer, workstation, data storage server, etc. so that a single or a plurality of devices is configured to perform functions such as communication, storage, and/or control. Thus, the central management server 100 may be configured with various types of hardware configurations.

Functions of respective blocks of the central management server 100 will be described. The communication unit 110 transceiver data between other devices through the communication network 400. The communication unit 110 may transceive various data related to incoming and outgoing of a vehicle by being connected to the incoming gate terminal 510 or to the outgoing gate terminal 520, or may be connected to another server to transceive various data.

For example, the communication unit 110 may receive a communication packet that indicates incoming vehicle information from an arbitrary incoming gate terminal 510, and receive a communication packet that indicates outgoing vehicle information from an arbitrary outgoing gate terminal 520. The incoming vehicle information includes a vehicle number recognized by the incoming gate terminal 510, incoming time or an incoming gate identifier or both. The outgoing vehicle information includes a vehicle number recognized by the outgoing gate terminal 520, a calculated fee, and outgoing time or an outgoing identifier or both.

The communication unit 110 may transmit to the PG server 300 a communication packet that indicates a payment based on a credit card according to a control of the control unit 170, and receive a response thereof. The communication unit 110 may transmit to the vehicle type management server 200 a communication packet that indicates a vehicle type information request including a recognized vehicle number according to a control of the control unit 170, and may receive a communication packet that indicates a response thereof.

The communication unit 110 may transceive other information or data according to a control of the control unit 170.

The storage unit 130 stores various data. The storage unit 130 stores various data used for using the incoming and outgoing vehicle management system of the present invention. It is preferable for the storage unit 130 to store data in a database format. For example, the storage unit 130 stores a vehicle management DB and a local business place database that are used for managing vehicles managed within the system of the present invention.

The vehicle management DB is a database for managing vehicles utilizing the present system. For example, the vehicle management DB includes a user table and a vehicle table.

The user table is a database table for managing users that are registered with the present system as members and is configured with a plurality of entries. Each entry is assigned to each user.

The user entry is configured with a plurality of fields, and each field is predefined. The user entry includes a user's name, a user ID (identifier), a password, an e-mail address, etc., and further includes an identifier of a portable terminal 600 and a number of a vehicle in use.

The identifier of the portable terminal 600 is an identifier used when accessing a mobile communication network of the communication network 400, and may be a mobile phone number, or an identifier of a portable terminal 600 that is used for delivering a push message.

The user entry may further include credit card information. For example, the credit card information includes a name, numbers, an expiration date of a credit card, and may further include a name of a credit card company, a card type, a password, etc. The credit card information may be used for an automatic payment using a credit card.

In order to perform an automatic payment required in the present system, the central management server 100 may receive credit card information from a user at the time of a user (member) registration, receive an approval from the PG server 300 through the communication network 400, and receive an approval number. An approval number associated with specific credit card information may be used for a credit card payment afterward.

The user entry may further include usage history information (item) of the present system. For example, the user entry may store an incoming gate identifier, incoming time, an outgoing gate identifier, outgoing time, a calculated fee, etc. as a single incoming and outgoing history, and store a plurality thereof.

The vehicle table is configured with a plurality of vehicle entries. The vehicle entry includes a vehicle number, a vehicle model name, a vehicle type (subcompact car, compact car, full size car, etc.), and a user identifier.

The vehicle type may be input by the user during the user registration, or may be determined by accessing the vehicle type management server 200 in real time during the user registration or while incoming and outgoing. The user identifier may indicate a user ID or an identifier of a portable terminal 600.

The vehicle table may pre-store vehicle type information of all vehicles known in the country. For example, the control unit 170 may constitute entries of all vehicles that are managed by the vehicle type management server 200 according to an access of the control unit 170 to the vehicle type management server 200. While constituting a vehicle entry configuration, inputs of a user identifier and a vehicle model name, etc. may be omitted, and may be input during the user registration afterward.

A vehicle entry of the vehicle table may be generated during the user registration. For example, when a user registers with the present system, the user may input his or her vehicle information (vehicle number, vehicle model name, vehicle type, etc.), and the control unit 170 constitutes the vehicle entry by receiving the input vehicle information. While constituting the vehicle entry configuration, the control unit 170 may receive a vehicle number and vehicle type information from the user and check whether the vehicle type is correct by transmitting it to the vehicle type management server 200.

The local business place DB is configured with a plurality of business places, each business place entry includes a title (name), a location of the business place, a characteristic type of the business place (for example, parking lot, tollgate, etc.), and an identifier of the business place. The identifier of the business place may be configured as a combination of numbers, letters, etc.

The business place entry includes an incoming gate list indicating at least one incoming gate terminal 510, and an outgoing gate indicating list at least one outgoing gate terminal 520.

The incoming gate list includes identifiers of the incoming gate terminals 510 so that respective incoming gates are distinguished with each other. The outgoing gate list includes identifiers of respective outgoing gate terminals 520. Each identifier of the incoming gate terminals 510 and each identifier of the outgoing gate terminals 520 may indicate a network address of each terminal, or may be configured with a combination of numbers, letters, etc. by being configured with a predetermined format so that the identifier is distinguished from another terminal.

The business place entry includes a connecting business place list through which the vehicle may exit according to the characteristic of the business place (for example, toll collection gate). The connecting business place list is configured with at least one entry, and each entry includes a business place identifier through which the vehicle may exit. The connecting business place list may include a single entry or a plurality of entries according to the characteristic of each business place.

The connecting unit 150 tranceives data between the storage unit 130, the communication unit 110, and the control unit 170. The connecting unit 150 may be configured with a parallel bus or a serial bus, or may be configured with a local network. The configuration of the connecting unit 150 may be varied according to a hardware configuration example of the central management server 100.

The control unit 170 controls the blocks of the central management server 100. The control unit 170 receives request information or status information as data through the communication unit 110, processes the request or the status by using a database, and transmits the processed request or status to blocks that have requested or transmitted the information through the communication unit 110 as a response. In addition, the control unit 170 is configured to inform the user of a process according to the request or the status.

Main processes of the control unit 170 will be described. The control unit 170 may provide a web page on a portable terminal 600 of the user through communication unit 110, and the user may register with the present system by using the portable terminal 600.

The user inputs information on the displayed web page, and the control unit 170 receives a user's name, a password, an e-mail address, an identifier of a portable terminal 600, a vehicle number, credit card information, etc. through the communication unit 110 and generates a user entry in the user table including such information. During this process, the control unit 170 may receive an approval (pre-approval) for a credit card payment in advance by being connected to the PG server 300 through the communication unit 110.

In addition, the control unit 170 may newly generate a vehicle entry in the vehicle table or change an existing vehicle entry of the vehicle table according to the user registration. For example, the control unit 170 may newly generate a vehicle entry according to the new user registration, record a vehicle number, a vehicle model name, a vehicle type (subcompact car, compact car, full size car, etc.), etc. that are input by the user, and record a user identifier recognized according to the user registration. Whether or not the vehicle type associated with the vehicle number is correct may be determined by the control unit 170 by accessing to the vehicle type management server 200 afterwards.

In addition, the control unit 170 may extract a vehicle entry associated with the vehicle number according to the user registration from the vehicle entry of the vehicle table that is preconfigured by cooperating with the vehicle type management server 200, and a user identifier of the extracted vehicle entry may be changed or added to the registered user.

The control unit 170 may register users that use the present system through the above processes, and obtain and store accurate vehicle type information associated with a vehicle of each user.

After registration, the user may utilize the present system. The control unit 170 receives incoming vehicle information indicating a vehicle is incoming from the incoming gate terminal 510 through the communication unit 110. The incoming vehicle information includes a vehicle number recognized from a vehicle image, and incoming time or an incoming gate identifier. The incoming gate identifier includes a business place identifier and further includes an identifier of an incoming gate terminal 510. The incoming gate identifier may identify at least a business place where the vehicle has entered.

By receiving the incoming vehicle information, the control unit 170 determines a vehicle type associated with the vehicle number of the incoming vehicle information by using a database (vehicle management DB). In detail, the control unit 170 retrieves a vehicle entry in a vehicle table by using the vehicle number of the incoming vehicle information and extracts a vehicle entry associated with the vehicle number. A vehicle type of the incoming vehicle may be determined by extracting a vehicle type field from the extracted vehicle entry. Alternatively, the control unit 170 may access to vehicle type management server 200 in real time by receiving the incoming vehicle information and receive vehicle type information that indicates the vehicle type associated with the vehicle number.

In addition, the control unit 170 retrieves a user associated with the vehicle number by using the vehicle number of the incoming vehicle information. In detail, the control unit 170 retrieves a specific user entry in a user table by using the vehicle number of the incoming vehicle information. The control unit 170 generates a new usage history item in the retrieved user entry and records incoming time and an incoming gate identifier in the generated usage history item.

In addition, by recognizing the incoming vehicle, the control unit 170 generates an incoming vehicle message for directing the incoming vehicle to an incoming gate, and transmits the generated incoming vehicle message to a portable terminal 600 designated to a user of the incoming vehicle through the communication unit 110.

In detail, by receiving the incoming vehicle information, the control unit 170 identifies the user of the incoming vehicle associated with the vehicle number by using the user table of the database. The control unit 170 may identify the user of the incoming vehicle associated with the vehicle number by retrieving the user entry by using the vehicle number. The control unit 170 generates the incoming vehicle message and transmits the generated incoming vehicle message to the portable terminal 600 designated to the user of the incoming vehicle by using the identifier of the user entry of the portable terminal 600. The transmitted incoming vehicle message includes the vehicle number of the incoming vehicle, the vehicle type, a business place name, and incoming time or an incoming gate identifier or both. Particularly, the incoming vehicle message may include an image code such as barcode, QR code, etc. The image code may include or indicate incoming identification information that is capable of indicating the recognized vehicle number, the vehicle type, and the incoming gate identifier or the incoming time.

The incoming vehicle message that is transmitted to the portable terminal 600 may be transmitted in a push message format. For example, the control unit 170 may transmit a push message to the portable terminal 600 by executing a function of a push server, or may transmit the generated message to the push server.

In addition, by receiving the incoming vehicle information and determining the vehicle type, the control unit 170 determines an outgoing gate terminal 520 through which the vehicle may exit based on the incoming gate identifier of the incoming vehicle information. For example, the control unit 170 extracts a business place entry that is associated with the business place identifier of the incoming gate identifier. The control unit 170 also extracts a connecting business place list from the extracted business place entry. The control unit 170 may determine at least one outgoing gate through which the vehicle may exit by using a business place identifier of each entry of the extracted connecting business place list. The outgoing gate may refer to the business place itself, to an outgoing gate terminal 520 within a specific business place, or to a managing terminal that manages an outgoing gate terminal 520 within a specific business place.

By determining the at least one outgoing gate through which the vehicle may exit, the control unit 170 generates incoming vehicle notification information including the recognized vehicle number, the vehicle type, and the incoming time or the incoming gate identifier, and transmits the generated incoming vehicle notification information to the determined outgoing gate through the communication unit 110.

According to the above control flows, the vehicle type may be automatically identified, incoming vehicle information may be automatically provided to a user, and information that an arbitrary vehicle may exit may be transmitted to another outgoing gate.

Since the control unit 170 may manage an outgoing vehicle, the control unit 170 receives from the outgoing gate terminal 520 outgoing vehicle information that indicates an outgoing vehicle through the communication unit 110. The outgoing vehicle information includes information about at least the recognized vehicle number, and outgoing (estimated) time or an outgoing gate identifier or both, and further includes a calculated fee. According to a design example, the fee may be calculated by the control unit 170 of the central management server 100. The outgoing gate identifier includes a business place identifier, and further includes an identifier of outgoing gate terminal 520. A business place in which exiting of the vehicle is predicted or has occurred may be identified by the outgoing gate identifier.

By receiving the outgoing vehicle information, the control unit 170 retrieves a user entry in a user DB by using the vehicle number of the outgoing vehicle information, and records the outgoing gate identifier, outgoing time, a calculated fee in an usage history item (most recent item or the last item) in the retrieved user entry. Each of the identifier, the outgoing item, and the fee may be extracted from the outgoing vehicle information.

In addition, the control unit 170 generates an outgoing vehicle message for directing the outgoing vehicle associated with the vehicle number of the outgoing vehicle information to an outgoing gate, and transmits the generated outgoing vehicle message to the portable terminal 600 designated to a user of the outgoing vehicle through the communication unit 110.

In detail, the control unit 170 generates the outgoing vehicle message that indicates an outgoing gate name, the outgoing time, and the calculated fee according to a usage of a toll road or a parking lot. In addition, the control unit 170 retrieves a user entry associated with the vehicle number by use thereof, and transmits the outgoing vehicle message to an identifier of the portable terminal 600 of the user entry. Accordingly, the user of the outgoing vehicle may know the outgoing gate through his or her mobile phone without an additional ticket.

The outgoing gate may include a blocking bar 550, but the blocking bar 550 of the outgoing gate may be controlled by the outgoing gate terminal 520. The outgoing gate terminal 520 may independently control the blocking bar 550, or may control the blocking bar 550 according to a control of the control unit 170 by cooperating with the control unit 170 of the central management server 100.

By receiving the outgoing vehicle information, the control unit 170 retrieves the associated user entry, and performs a credit card payment by using credit card information of the user entry by cooperating with the PG server 300. For example, the control unit 170 may generate a payment request message including an approval number (or a pre-approval number) that is pre-obtained through the PG server 300 or, a name, numbers, an expiration date, etc. of the credit card to the PG server 300 by using the communication unit 110, and receive a payment response (approval or refusal of a card transaction) through the communication unit 110.

By receiving the payment response, the control unit 170 generates blocking bar control information, and transmits the generated blocking bar control information to the outgoing gate terminal 520 to which the outgoing vehicle information is transmitted through the communication unit 110. The blocking bar control information may be data that controls opening of the blocking bar 550 that is controlled by the outgoing gate terminal 520. Alternatively, the blocking bar control information may be data that requests an additional fee process while maintaining the blocking bar 550 being closed (maintaining closed).

When the outgoing gate terminal 520 independently controls the blocking bar 550 in separation of generating and transmitting the outgoing vehicle information, a transmission of such blocking bar control information to the outgoing gate terminal 520 may be omitted.

Figure 3:
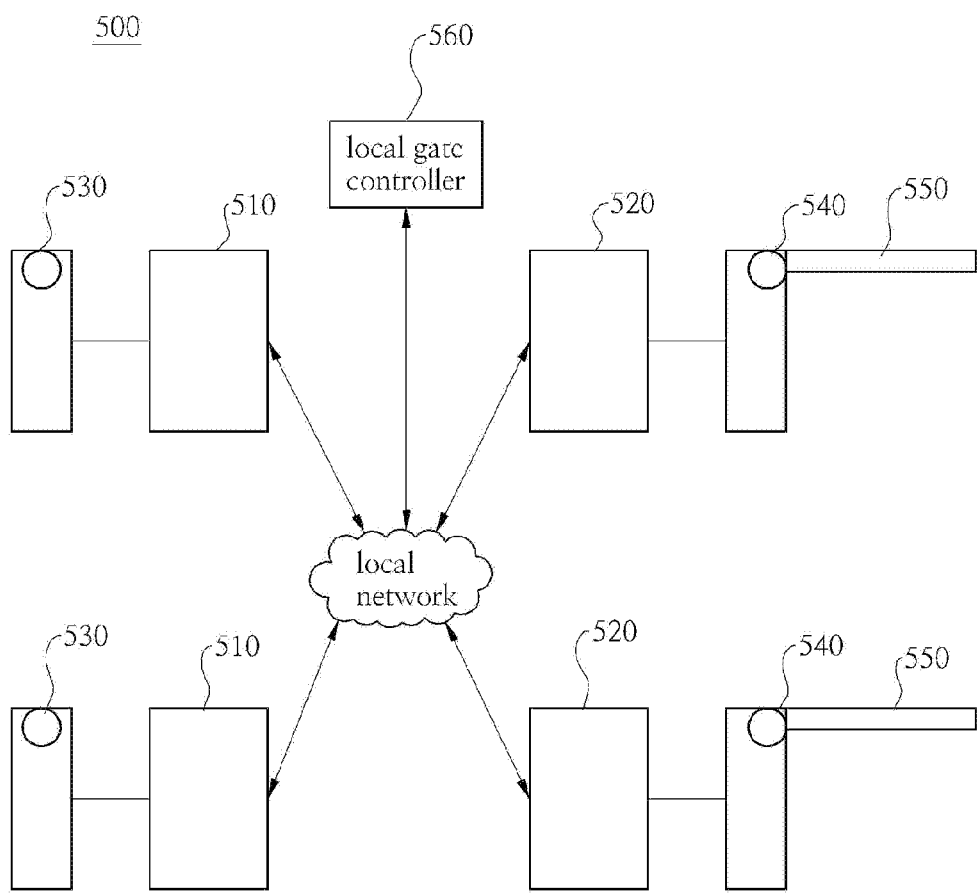
FIG. 3 is a view showing an exemplary system block diagram of a local management system.

FIG. 3 is a view showing an exemplary system block diagram of the local management system 500.

According to FIG. 3, the local management system 500 includes at least one incoming gate terminal 510, at least one outgoing gate terminal 520, at least one incoming vehicle recognizing camera 530, at least one outgoing vehicle recognizing camera 540, at least one blocking bar 550, and a local gate controller 560. According to a design modification, a specific configuration component may be omitted or added. For example, the local gate controller 560 may be omitted, or an openable and closable blocking bar may be additionally added by the incoming gate terminal 510.

Each block of the local management system 500 will be described. The incoming vehicle recognizing camera 530 includes an image sensor such as CCD, CMOS, etc. and a lens, captures an image of an incoming vehicle, and outputs a captured image signal to the incoming gate terminal 510.

The incoming vehicle recognizing camera 530 may capture a vehicle image according to a control of the incoming gate terminal 510.

The incoming gate terminal 510 receives the image signal captured by the incoming vehicle recognizing camera 530 by being connected thereto, and extracts a vehicle number from the received image. The incoming gate terminal 510 includes at least an executable unit that is referred as a processor, CPU, MPU, etc. and capable of executing program instruction codes, a storage medium such as non-volatile memory, hard disk, etc., and a communication interface to be connected to the local network. The storage medium stores a program that is executed in the executable unit, and the communication interface is directly connected to the communication network 400 through a wired or wireless local network, or connected to the communication network 400 through the local gate controller 560, so that the incoming gate terminal 510 transceive information, control information, etc. between the central management server 100.

The incoming gate terminal 510 may receive an incoming vehicle signal from a vehicle detector for detecting the incoming vehicle (not shown in the figure) by being connected thereto, and receive a captured vehicle image by controlling the incoming vehicle recognizing camera 530 according to the incoming vehicle signal. The incoming gate terminal 510 may extract a vehicle number from the vehicle image by using a program of the storage medium. For example, the incoming gate terminal 510 may extract the vehicle number by using an optical character reader (OCR) program.

As the vehicle number is extracted, incoming vehicle information including the vehicle number, an incoming gate identifier (business place identifier or identifier of the incoming gate terminal 510 or both are stored in the storage medium) or incoming time or both may be generated, and the generated incoming vehicle information is transmitted to the central management server 100 through the local network. The incoming vehicle information is directly transmitted to the central management server 100 by the incoming gate terminal 510 through the communication network 400, or is transmitted to the central management server 100 via the incoming local gate controller 560. The identifier of the incoming vehicle information may be recognized as an identifier of a communication channel that is set between the central management server 100, and the identifier may be extracted from a communication packet constituting the incoming vehicle information. Information included in the incoming vehicle information may be generated by the incoming gate terminal 510 or by the local gate controller 560.

The outgoing vehicle recognizing camera 540 includes an image sensor such as CCD, CMOS, etc. and a lens, captures a vehicle image of an incoming or outgoing vehicle, and outputs a captured image signal to the outgoing gate terminal.

The outgoing vehicle recognizing camera 540 may capture a vehicle image according to a control of the outgoing gate terminal 520.

The outgoing gate terminal 520 receives an image signal that is captured by the outgoing vehicle recognizing camera

540 by being connected thereto, and extracts a vehicle number from the received image.

The outgoing gate terminal 520 includes at least an executable unit that is referred to as a processor, CPU, MPU, etc. and capable of executing program instruction codes, a storage medium such as non-volatile memory, hard disk, etc., and a communication interface to be connected to the local network. The storage medium stores a program that is executed in the executable unit, and the communication interface is directly connected to the communication network 400 through a wired or wireless local network, or connected to the communication network 400 through the local gate controller 560, so that the outgoing gate terminal 520 transceive information, control information, etc. between the central management server 100.

The outgoing gate terminal 520 may receive incoming vehicle notification information from the central management server 100 through the communication network 400, generate an incoming vehicle item associated with the incoming vehicle notification information, and store the generated incoming vehicle item in the storage medium. The incoming vehicle item may include a vehicle number, a vehicle type, and incoming time or an incoming gate identifier of the incoming vehicle notification information.

In addition, the outgoing gate terminal 520 may receive a outgoing vehicle signal from a vehicle detector for detecting an outgoing vehicle (not shown in the figure) by being connected thereto, and receive the captured vehicle image by controlling the outgoing vehicle recognizing camera 530 according to the outgoing vehicle signal. The outgoing gate terminal 520 may attempt to extract a vehicle number from the vehicle image by using a program stored in the storage medium. For example, the outgoing gate terminal 520 may attempt to extract the vehicle number by using an optical character reader (OCR) program.

When the vehicle number is recognized, the outgoing gate terminal 520 retrieves (extracts) an incoming vehicle item associated with the recognized vehicle number from at least one stored incoming vehicle item. When the incoming vehicle item is not retrieved, the outgoing gate terminal 520 may output the incoming vehicle item by using a provided display.

When the incoming vehicle item is retrieved, the outgoing gate terminal 520 calculates a fee based on the incoming time, the vehicle type or the incoming gate identifier or both of the incoming vehicle item. For example, the outgoing gate terminal 520 may calculate a parking fee based on a difference between the incoming time and outgoing time that indicates recognized time of the outgoing vehicle number, or may calculate a toll based on a distance between the incoming gate identifier and the outgoing gate identifier (business place identifier of the local management system 500 or the identifier of the outgoing gate terminal 520 or both).

The outgoing gate terminal 520 generates outgoing vehicle information including outgoing (estimated) time, a calculated fee, a recognized vehicle number, a vehicle type, and an outgoing gate identifier, and transmits the generated outgoing vehicle information to the central management server 100 through the local gate controller 560 or may directly transmit to the central management server 100.

The outgoing gate terminal 520 that has transmitted the outgoing vehicle information after retrieving the incoming vehicle item may open an outgoing gate by controlling the connected blocking bar 550. The control of the blocking bar 550 is performed by the outgoing gate terminal 520, but, may be performed by blocking bar control information received from the central management server 100.

When the vehicle number is not recognized, a manager of the outgoing gate terminal 520 may request to a user of a vehicle to show an incoming vehicle message that is transmitted to a portable terminal 600 designated to the user. The outgoing gate terminal 520 may include an optical interface (for example, portable barcode reader, portable camera, etc.) and recognize the incoming vehicle message displayed on the portable terminal 600.

The outgoing gate terminal 520 may extract an image code of the incoming vehicle message and recognize incoming identification information from the extracted image code. The incoming identification information includes the vehicle number, the vehicle type, and the incoming gate identifier or the incoming time that are recognized by the incoming gate terminal 510.

The outgoing gate terminal 520 may calculate a fee based on incoming vehicle time associated with the vehicle number, or incoming gate identifier and the vehicle type information recognized from the incoming vehicle message displayed on the portable terminal 600.

The blocking bar 550 may block outgoing of a vehicle (or incoming of a vehicle) in the outgoing gate (or in an incoming gate). The blocking bar 550 may open the outgoing gate (or the incoming gate) according to a control signal of the outgoing gate terminal 520 (or the incoming gate terminal 510) by being connected thereto. The blocking bar 550 may be set to block outgoing of a vehicle (or incoming) as default.

The local gate controller 560 is connected to at least one incoming gate terminal 510 (preferably, a plurality thereof) and to at least one outgoing gate terminal 520 (preferably, a plurality thereof) through the local network and controls the incoming gate terminal 510 and the outgoing gate terminal 520. For example, the local gate controller 560 may control ON/OFF, settings, etc. of the incoming gate terminal 510 or the outgoing gate terminal 520.

In addition, the local gate controller 560 may store a business place identifier, reconfigure incoming vehicle information or outgoing vehicle information (for example adding a business place identifier, replacing an identifier of incoming or outgoing gate terminal with a business place identifier) by using information received from the incoming gate terminal 510 or the outgoing gate terminal, and transmit the reconfigured information to the central management server 100 through the communication network 400. The local gate controller 560 may receive incoming vehicle notification information from the central management server 100 and transmit the received incoming vehicle notification information to all outgoing gate terminals 520 connected to the local network. According to a design, the local gate controller 560 may be omitted.

The local network (drawing symbol thereof not shown) of the local management system 500 may be, for example, an Ethernet or a Wi-Fi, etc. All incoming gate terminals 510 and the outgoing gate terminals 520 may be connected to the local network to transceive data with each other. The incoming gate terminal 510 and the outgoing gate terminal 520 may be connected to the communication network 400 through the local network. For example, the incoming gate terminal 510 or the outgoing gate terminal 520 may be connected to the central management server 100 through the local gate controller 560, or may be connected to the central management server 100 through a gateway (not shown).

FIG. 4 is a view showing an exemplary flow of an incoming and outgoing vehicle management method based on a vehicle type recognized from a vehicle number. The flows of FIG. 4 are performed by cooperation between devices. Hereinafter, contents that are described with reference to FIGS. 1 to 3 will be briefly described. Various processes performed in the central management server 100 may be performed by a control of the control unit 170, various controls performed in the outgoing gate terminal 520 or in the incoming gate terminal 510 may be performed by a control of the executable unit.

First, a user who wants to use the incoming and outgoing vehicle management system of the present invention performs a user registration (Refer to ①) by being connected to the central management server 100. According to the user registration, the central management server 100 generates a new user entry in a user table, and sets a user's name, a user ID, a password, an e-mail address, etc., an identifier of a portable terminal 600, and a vehicle number in use in the user entry. In addition, the central management server 100 sets credit card information in the user entry. According to the set credit card information, the central management server 100 may check the set credit card or receive an (pre)approval for using the card afterwards by cooperating with the PG server 300.

During the user registration of after, the central management server 100 constitutes a vehicle entry of a vehicle of the user (Refer to ②). For example, the central management server 100 may generate a new vehicle entry associated with a vehicle number of the vehicle of the user, or may set a user identifier in the vehicle entry by retrieving the vehicle number. The vehicle entry includes vehicle type information, and the vehicle type information may be preset (before ①) by cooperating with the vehicle type management server 200, or may be set in real time according to the user registration.

For example, the central management server 100 may transmit to the vehicle type management server 200 vehicle type request information that includes a vehicle number to be registered by the user, receive a response message indicating a retrieved vehicle type, determine the vehicle type, and set the determined vehicle type in the vehicle entry.

The user may automatically receive incoming and outgoing managements of his or her vehicle by using such a user registration process and a vehicle entry configuration process.

A specific incoming gate terminal 510 recognizes an incoming vehicle through the vehicle detector, controls the incoming vehicle recognizing camera 530 and captures a vehicle image, and recognizes a vehicle number from the capture image (Refer to ③).

The incoming gate terminal 510 generates incoming vehicle information and transmits the generated information to the central management server 100 through the communication network 400. The central management server 100 receives the incoming vehicle information (Refer to ④). The generated incoming vehicle information includes the vehicle number recognized from the vehicle image, incoming time or an incoming gate identifier.

The central management server 100 determines a vehicle type associated with the vehicle number of the incoming vehicle information by receiving the incoming vehicle information (Refer to ⑤). In order to determine the vehicle type, the central management server 100 may extract a vehicle entry associated with the vehicle number from a vehicle table of the vehicle management DB and determine the vehicle type by extracting data of a vehicle type field of the extracted vehicle entry.

In addition, the central management server 100 determines a user associated to the vehicle number of the incoming vehicle information by using a user table of the vehicle management DB, generates a usage history item in a user entry of the determined user, and records the incoming gate identifier or incoming time.

The central management server 100 that has recognized the incoming vehicle by using the incoming gate terminal 510 managed thereby provides the incoming vehicle information to a user of the incoming vehicle. For this, the central management server 100 generates an incoming vehicle message for directing the incoming vehicle to an incoming gate, and transmits the generated incoming vehicle message to a portable terminal 600 designated to the user of the incoming vehicle (Refer to ⑥). For example, the central management server 100 may generate incoming vehicle message including incoming identification information that includes the recognized vehicle number, and the incoming time or incoming gate identifier. The incoming identification information may be expressed as letters or may be further include an image code. The image code may be a barcode, a QR code, etc.

After determining the vehicle type of the recognized vehicle, the central management server 100 determines an outgoing gate(s) through which the vehicle may exit (Refer to ⑦). In other words, the central management server 100 determines at least one outgoing gate through which the vehicle may exit based on the incoming gate identifier of the incoming vehicle information.

For this, the central management server 100 uses the incoming gate identifier of the incoming vehicle information and extracts a business place entry associated with the incoming gate identifier from the local business place DB. The central management server 100 may extract a connecting business place list from the extracted business place entry and determine the outgoing gate by using an identifier of each business place of the extracted connecting business place list. According to an incoming gate type, the outgoing gate may be the same as the incoming gate, or there may be a plurality of outgoing gates.

The central management server 100 determines the outgoing gate and generates incoming vehicle notification information, and transmits the generated incoming vehicle notification information to the at least one determined outgoing gate through the communication network 400 (Refer to ⑧). The incoming vehicle notification information is transmitted to the local gate controller 560 or to all outgoing gate terminals 520 associated with the outgoing gate. The incoming vehicle notification information includes the recognized vehicle number, the vehicle type, the incoming time or the incoming gate identifier.

The outgoing gate terminal 520 may receive the incoming vehicle notification information, generate an incoming vehicle item associated with the incoming vehicle notification information and store the generated incoming vehicle item in the storage medium. Thus, the outgoing gate terminal 520 is configured to pre-store a plurality of incoming vehicle items of which vehicles may exit, calculate a fee by using the pre-stored incoming vehicle items, and automatically manage exits of the vehicles afterwards.

Then, the outgoing gate terminal 520 captures a vehicle image by using the outgoing vehicle recognizing camera 540, and attempts to recognize a vehicle number from the captured vehicle image by using an OCR program (Refer to ⑨).

When the vehicle number is recognized from the vehicle image, by receiving the incoming vehicle notification information, the outgoing gate terminal 520 extracts an incoming vehicle item associated with the recognized vehicle number from the plurality of stored incoming vehicle items. The outgoing gate terminal 520 calculates a fee based on the vehicle type, the incoming time or the incoming gate identifier of the extracted incoming vehicle item (Refer to ⑩).

When the vehicle number is not recognized, a manger of the outgoing gate may request the user to show the vehicle the incoming vehicle message, and the user of the vehicle may show the incoming vehicle message. The outgoing gate terminal 520 may recognize the incoming identification information of the incoming vehicle message in an image code, decode the recognized image code, and recognize the vehicle number, the vehicle type, and the incoming time or the incoming gate identifier.

By using the recognized information, the outgoing gate terminal 520 may calculate a fee according to incoming and outgoing managements of the vehicle (Refer to ⑪). During this process, the outgoing gate terminal 520 may extract the incoming vehicle item associated with the vehicle number of the image code, and check the vehicle type, the incoming time or the incoming gate identifier from the extracted incoming vehicle item.

The outgoing gate terminal 520 generates outgoing vehicle information including the calculated fee and the recognized vehicle number, and transmits the generated outgoing vehicle information to the central management server 100 (Refer to ⑫). The outgoing gate terminal 520 that has transmitted the outgoing vehicle information may open the outgoing gate by controlling the blocking bar 550, or control the blocking bar 550 according to a control of the central management server 100 (Refer to ⑭ and ⑮).

By receiving the outgoing vehicle information, the central management server 100 determines a user entry associated with the vehicle number, records an outgoing gate identifier extracted from the outgoing vehicle information of usage history item (wherein only incoming vehicle information is included) of the determined user entry, outgoing time, the calculated fee, and processes a credit payment by using the PG server 300.

In addition, the central management server 100 generates an outgoing vehicle message for directing the outgoing vehicle to the outgoing gate, and transmits the generated outgoing vehicle message to the portable terminal 600 designated to the user of the vehicle (Refer to ⑬). The outgoing vehicle message may include a name of the outgoing gate, the outgoing time, the calculated fee, and information such as whether or not a credit card payment is performed (payment is made).

In addition, the central management server 100 may transmit blocking bar control information that may be generated according to a result of the credit card payment, and transmit the generated blocking bar control information to the outgoing gate terminal 520 (Refer to ⑭). The outgoing gate terminal 520 may control the blocking bar 550 according to the received blocking bar control information (Refer to ⑮).

The vehicle type of the vehicle may be simply obtained by the above control flows, incoming vehicle and outgoing vehicle of various vehicle types may be automatically managed, and a fee of incoming and outgoing may be calculated at the local according to the incoming vehicle notification information.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of managing incoming and outgoing of a vehicle based on a vehicle number and a vehicle type identified therefrom, the method comprising:
   receiving, by a central management server, incoming vehicle information including a vehicle number recognized from a vehicle image, and incoming time or an incoming gate identifier;
   determining, by the central management server, a vehicle type by using the vehicle number included in the incoming vehicle information;
   generating an incoming vehicle message for directing the incoming vehicle to an incoming gate and transmitting, by the central management server, the generated incoming vehicle message to a portable terminal designated to a user of the vehicle,
   determining, by the central management server, at least one outgoing gate through which the vehicle may exit based on the incoming gate identifier of the incoming vehicle information after determining the vehicle type; and
   transmitting, by the central management server, incoming vehicle notification information including the recognized vehicle number, and the incoming time or the incoming gate identifier to the determined outgoing gate,
   wherein the incoming vehicle message includes incoming identification information that indicates the recognized vehicle number, and the incoming time or the incoming gate identifier.

2. The method of claim 1, wherein the determining of the vehicle type includes: extracting a vehicle entry associated with the vehicle number from a vehicle management DB by using the recognized vehicle number; and determining the vehicle type by extracting data from a vehicle type field of the extracted vehicle entry,
   wherein the vehicle management DB is configured to cooperate with a vehicle type management server.

3. The method of claim 1, further comprising:
   capturing, by an outgoing gate terminal, a vehicle image and attempting to recognize a vehicle number from the captured vehicle image;
   when the vehicle number is recognized,
   calculating, by the outgoing gate terminal, a fee based on incoming time or an incoming gate identifier of a vehicle associated with the recognized vehicle number of the incoming vehicle notification information stored therein;
   generating, by the outgoing gate terminal, outgoing vehicle information including the fee and the recognized vehicle number, and transmitting the generated outgoing vehicle information to the central management server; and
   generating, by the central management server, an outgoing vehicle message for directing the vehicle to an outgoing gate and transmitting the generated outgoing vehicle message to the portable terminal designated to a user of the vehicle.

4. The method of claim 3, further comprising:
   when the vehicle number is not recognized,
   recognizing, by the outgoing gate terminal, the incoming identification information of the incoming vehicle message from the portable terminal, and calculating a fee based on the incoming time or the incoming gate identifier of the recognized vehicle number.

5. A system for managing incoming and outgoing of a vehicle based on a vehicle number and a vehicle type identified therefrom, the system comprising:
- a central management server identifying a vehicle type based on a vehicle number, and managing incoming and outgoing of a vehicle, the central management server including:
- a communication unit receiving/transmitting data from/to an incoming gate terminal and an outgoing gate terminal, and receiving incoming vehicle information including a vehicle number recognized from a vehicle image, and incoming time or an incoming gate identifier from the incoming gate terminal; and
- a control unit determining the vehicle type of the vehicle by using the vehicle number of the incoming vehicle information, generating an incoming vehicle message for directing an incoming vehicle to an incoming gate, and transmitting the generated incoming vehicle message to a portable terminal designated to a user of the vehicle,
- wherein the incoming vehicle message includes incoming identification information that indicates the recognized vehicle number, and the incoming time or the incoming gate identifier,
- wherein the control unit determines at least one outgoing gate through which the vehicle may exit, based on the incoming gate identifier of the incoming vehicle information after determining the vehicle type; and
- transmitting incoming vehicle notification information including the recognized vehicle number, and the incoming time or the incoming gate identifier to the determined outgoing gate.

6. The system of claim 5, wherein the central management server further includes a storage unit storing a vehicle management DB, wherein in order to determine the vehicle type, the control unit extracts a vehicle entry associated with the vehicle number from the vehicle management DB by using the recognized vehicle number, and determines the vehicle type by extracting data from a vehicle type field of the extracted vehicle entry, the vehicle management DB being configured to cooperate with a vehicle type management server.

7. The system of claim 5, further comprising:
- a plurality of outgoing gate terminals capable of receiving the incoming vehicle notification information from the central management server, wherein a first outgoing gate terminal thereof captures a vehicle image and attempts to recognize a vehicle number from the captured vehicle image, and
- when the vehicle number is recognized,
- the first outgoing gate terminal calculates a fee based on incoming time or an incoming gate identifier of a vehicle associated with the recognized vehicle number of the incoming vehicle notification information stored therein, generates outgoing vehicle information including the fee and the recognized vehicle number, and transmits the generated outgoing vehicle information to the central management server, and
- the central management server generates an outgoing vehicle message for directing of the vehicle to an outgoing gate and transmits the generated outgoing vehicle message to a portable terminal designated to a user of the vehicle.

8. The system of claim 7, wherein when the vehicle number is not recognized, the first outgoing gate terminal recognizes the incoming identification information of the incoming vehicle message from the portable terminal and calculates a fee based on the incoming time or the incoming gate identifier of the recognized vehicle number.

* * * * *